(12) United States Patent
Min

(10) Patent No.: US 10,118,264 B2
(45) Date of Patent: Nov. 6, 2018

(54) NUMERICALLY CONTROLLED MACHINE TOOL

(71) Applicant: Byung Duk Min, Gyeonggi-do (KR)

(72) Inventor: Byung Duk Min, Gyeonggi-do (KR)

( * ) Notice: Subject to any disclaimer, the term of this patent is extended or adjusted under 35 U.S.C. 154(b) by 264 days.

(21) Appl. No.: 14/888,384

(22) PCT Filed: Apr. 23, 2014

(86) PCT No.: PCT/KR2014/003528
§ 371 (c)(1),
(2) Date: Oct. 30, 2015

(87) PCT Pub. No.: WO2014/178559
PCT Pub. Date: Nov. 6, 2014

(65) Prior Publication Data
US 2016/0082558 A1 Mar. 24, 2016

(30) Foreign Application Priority Data

May 3, 2013 (KR) .................. 10-2013-0050013

(51) Int. Cl.
*B23Q 1/01* (2006.01)
*B23C 1/00* (2006.01)
*B23Q 3/157* (2006.01)

(52) U.S. Cl.
CPC .............. *B23Q 1/015* (2013.01); *B23C 1/002* (2013.01); *B23C 1/007* (2013.01); *B23Q 1/012* (2013.01);
(Continued)

(58) Field of Classification Search
CPC ............... Y10T 408/91; Y10T 408/935; Y10T 409/309576; Y10T 409/309632;
(Continued)

(56) References Cited

U.S. PATENT DOCUMENTS 6,068,431 A * 5/2000 Line ...................... B23Q 1/012
144/2.1
6,798,088 B2 * 9/2004 Hsu ...................... B23Q 1/012
310/12.13
(Continued)

FOREIGN PATENT DOCUMENTS

JP 2005262375 A 9/2005
JP 2006021271 A 1/2006
(Continued)

OTHER PUBLICATIONS

"International Search Report", issued in related International Application No. PCT/KR2014/003528, dated Jul. 22, 2014, Publisher: ISA / KR.

*Primary Examiner* — Sunil K Singh
*Assistant Examiner* — Michael Vitale
(74) *Attorney, Agent, or Firm* — Kaplan Breyer Schwarz, LLP

(57) ABSTRACT

A numerically controlled machine tool that can accurately control a position of a machining member for machining a workpiece. The numerically controlled machine tool comprises: a first post member installed on a main body slidingly in a left/right direction; and first, second and third horizontal rails installed on the main body lengthily in the left/right direction and respectively coupled to two points of the rear surface and one point of the front surface of the first post member for guiding sliding of the first post member.

12 Claims, 3 Drawing Sheets

(52) U.S. Cl.
CPC .......... *B23Q 1/017* (2013.01); *B23Q 3/15706* (2013.01); *Y10T 409/307728* (2015.01); *Y10T 409/308288* (2015.01); *Y10T 409/309576* (2015.01); *Y10T 483/1795* (2015.01)

(58) Field of Classification Search
CPC  Y10T 409/307728; Y10T 409/308288; B23Q 1/015; B23Q 1/017; B23Q 1/01; B23Q 1/012; B23Q 1/621; B23Q 1/626; B23C 1/002; B23C 1/007; B23B 39/006; B24B 7/005
USPC ......... 409/235, 236, 202, 212; 408/234, 237
See application file for complete search history.

(56) References Cited

U.S. PATENT DOCUMENTS

| | | | |
|---|---|---|---|
| 2006/0008335 A1* | 1/2006 | Furuhashi | B23Q 1/012 409/202 |
| 2010/0119319 A1* | 5/2010 | Chang | B23Q 5/40 409/144 |
| 2012/0039683 A1* | 2/2012 | Sugiyama | B23Q 1/012 409/202 |

FOREIGN PATENT DOCUMENTS

| | | |
|---|---|---|
| KR | 19960013171 Y1 | 2/1999 |
| KR | 20070118598 A | 12/2007 |
| KR | 20090032675 A | 4/2009 |
| KR | 20130012692 A | 2/2013 |

\* cited by examiner

[Fig. 1]
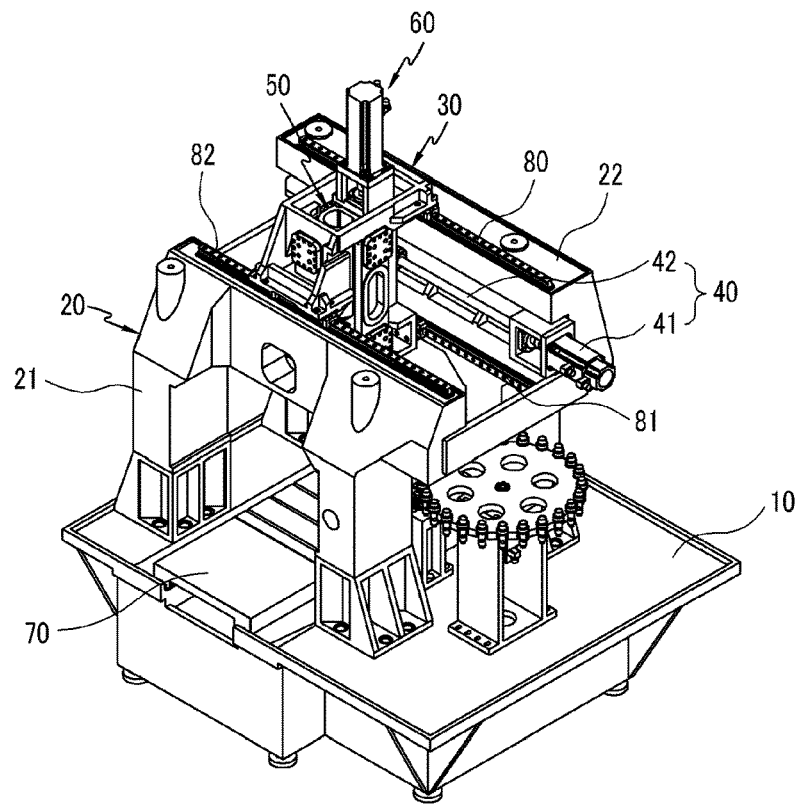
[Fig. 2]
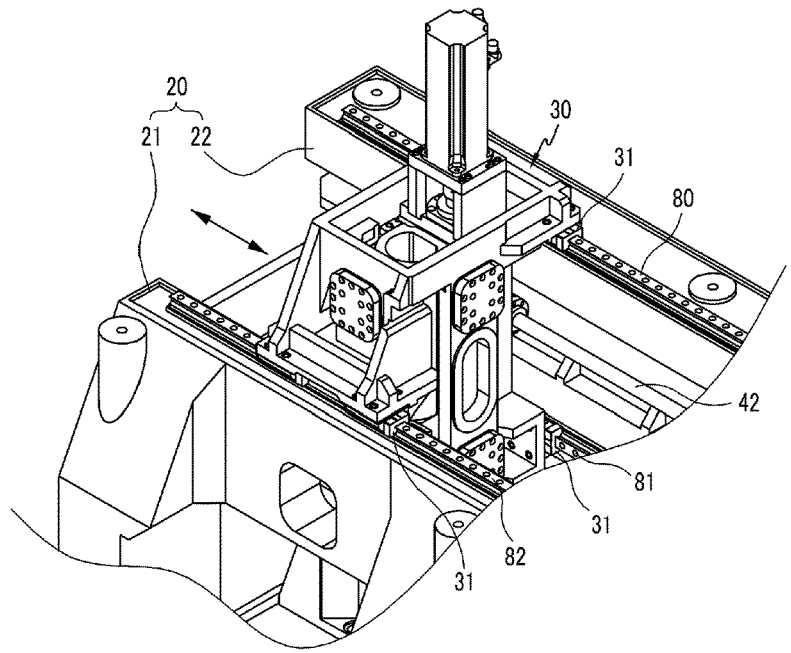

[Fig. 3]
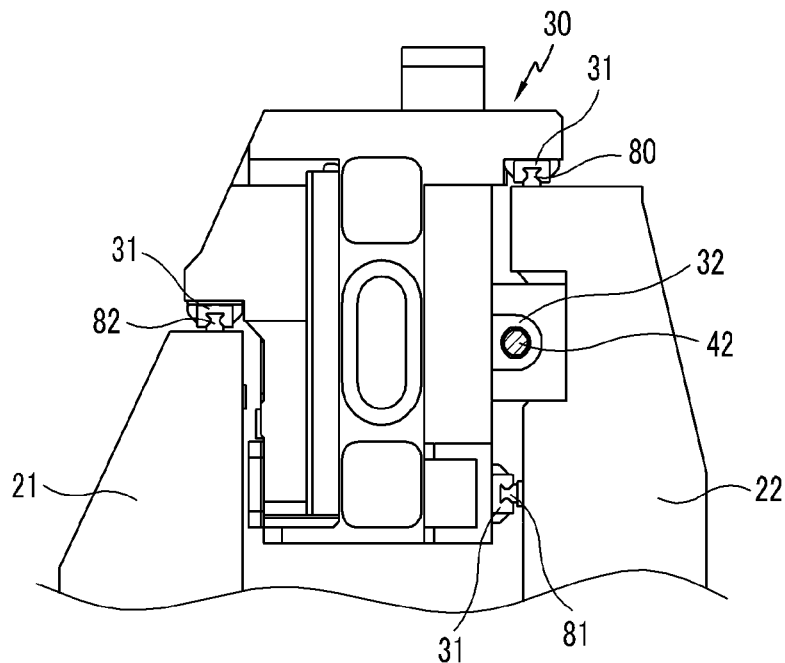
[Fig. 4]
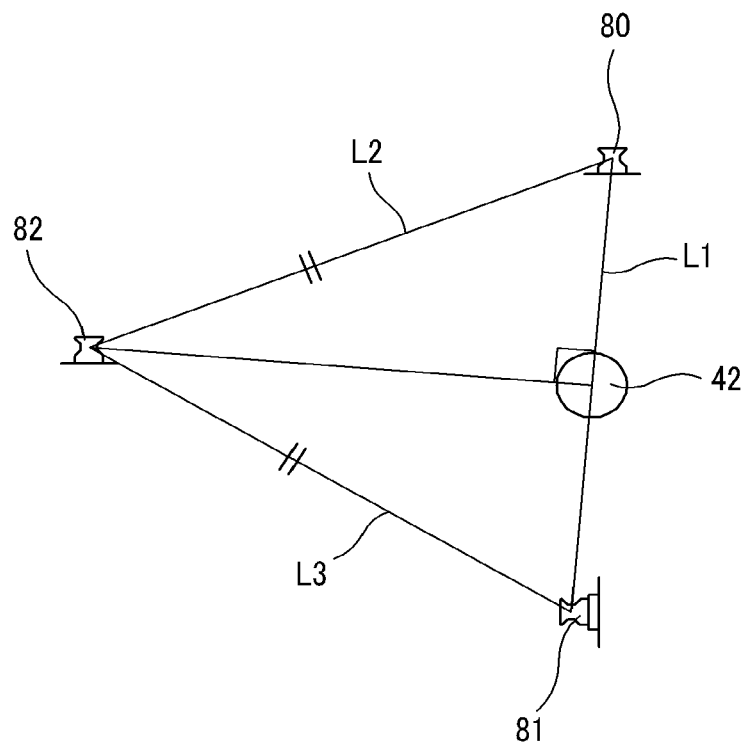

[Fig. 5]
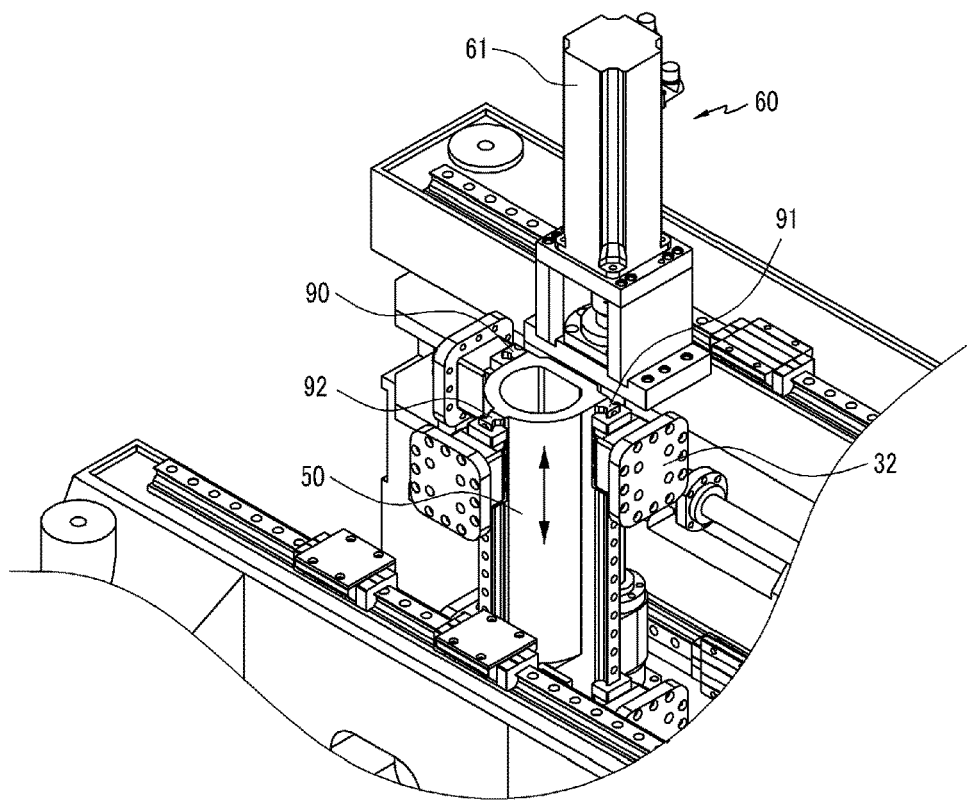
[Fig. 6]
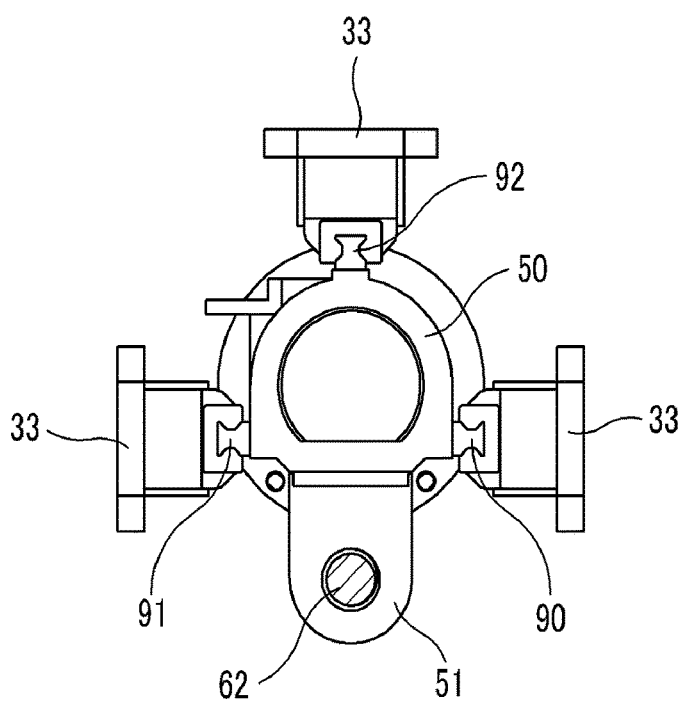

NUMERICALLY CONTROLLED MACHINE TOOL

FIELD OF THE INVENTION

The present invention relates to a numerically controlled machine tool, and more particularly, to a numerically controlled machine tool which may accurately control a position of a machining member for machining a workpiece.

BACKGROUND OF THE INVENTION

A numerically controlled machine tool is a machine tool that is driven by using a numerical control device and is called an NC machine tool. The numerical control device includes a calculator command mechanism for ordering an operation of the machine tool, a mechanism for detecting whether the machine tool moves according to the command, and a mechanism that compares a target value to a detected value to automatically correct an error when the target value and the detected value are different from each other.

A machining order, a cutting speed, and a kind or size of cutting tool which are provided as machining conditions of a workpiece are analyzed as symbols that are expressed by specific numbers from a machining drawing. When these symbols are inputted into the control device, a command is inputted into the machine tool to operate according to the command, thereby automatically cutting the workpiece.

Numerically controlled machine tools that are produced for manufacturing a plurality of components may be applicable to cam cutting by a milling machine or a process for automatically a punching position in a boring machine. In recent years, the numerical control method may be adopted to a lathe and thus generalized. As semiconductor technologies and computers are developed, an NC machine tool in which a computer is built may be called a computerized numerical control (CNC) machine tool.

Examples of the CNC machine tool according to the related art are disclosed in Korean Patent Application No. 1996-0013171 (hereinafter, referred to as "Prior Document 1") and Korean Patent Application No. 2009-0032675 (hereinafter, referred to as "Prior Document 2").

According to the CNC lathe of Prior Document 1, a main shaft spindle bundle for machining a workpiece vertically and horizontally moves to automatically determine a position of a chuck for machining the workpiece. Here, a pair of guides for horizontally moving the main shaft spindle bundle is lengthily installed in a horizontal direction. The two guides are vertically spaced apart from each other. A back surface of the main spindle bundle is slidably coupled to the pair of guides.

According to the CNC lathe of Prior Document 1, which has the above-described structure, only the back surface of the main shaft spindle is supported by the guides, and a front surface is not supported. Thus, while the main shaft spindle bundle is horizontally slid, a load may be concentrated forward to interrupt smooth sliding. As a result, it may be difficult to accurately control a position of the chuck.

According to the CNC machine tool of Prior Document 2, three driving parts are vertically slid to automatically determine a position of a cutter for machining a workpiece. Here, a pair of guides for vertically sliding the three driving parts is lengthily installed in a vertical direction on a front surface of a post member. The two guides are horizontally spaced apart from each other. A back surface of the sliding member for supporting the three driving parts is slidably coupled to the pair of guides.

According to the CNC machine tool of Prior Document 2, which has the above-described structure, only the back surface of the sliding member is supported by the guides, and a front surface is not supported, like Prior Document 1. Thus, while the sliding member is vertically slid, a load may be concentrated forward to interrupt smooth sliding. As a result, it may be difficult to accurately control a position of the cutter.

SUMMARY OF THE INVENTION

Technical Problem

To solve the conventional problems as described above, an object of the present invention is to provide a numerically controlled machine tool in which concentration of a post member, which is slid to control a position of a machining member, in one direction is prevented to realize smooth sliding of the post member and accurately locate the machining member at a proper position.

Technical Solution

A numerically controlled machine tool of the present invention includes: a first post member installed on a main body so as to be slidable in a left/right direction; and first, second, and third horizontal rails lengthily installed on the main body in the left/right direction, the first, second, and third horizontal rails being respectively coupled to two point of a back surface and one point of a front surface of the first post member to guide the sliding of the first post member.

The first and second horizontal rails may be installed to be vertically spaced apart from each other on a rear side of the first post member, and the third horizontal rail may be installed on a front side of the first post member.

The third horizontal rail may be disposed at a position corresponding between heights of the first and second horizontal rails.

A first driving part constituted by a first driving motor and a first driving screw to slide the first post member may be disposed between the first and second rails, wherein the first driving screw may be disposed at a center of a line connecting driving centers of the first and second horizontal rails to each other, and the third horizontal rail may be disposed on a line that is perpendicular to the center of the line connecting the driving centers of the first and second horizontal rails to each other.

A line connecting driving centers of the first and third horizontal rails to each other and a line connecting driving centers of the second and third horizontal rails to each other may have the same length.

The numerically controlled machine tool may further include: a second post member installed on the first post member so as to be slidable in a vertical direction; and first, second, and third vertical rails lengthily installed on the second post member in the vertical direction, the first, second, and third being respectively coupled to three points of the first post member to guide elevation of the second post member with respect to the first post member.

The first and second vertical rails may be installed opposite to each other on both side portions of the second post member, and the third vertical rail may be installed on a front surface of the second post member.

A second driving part constituted by a second driving screw that is screw-coupled to a back surface of the second post member to vertically slide the second post member and a second driving motor for driving the second driving screw may be lengthily installed at a rear center of the second post member in the vertical direction, and the third vertical rail and the second driving screw may be disposed in parallel to each other on opposite sides with respect to the second post member.

Advantages Effects

The numerically controlled machine tool according to the present invention may have following effects.

First, since the two points of the back surface and the one point of the front surface of the first post member that is slid in the left/right direction are slidably supported by the first, second, and third horizontal rails, the load of the first post member may be supported by the third horizontal rail to minimize the position displacement, which may occur by the errors of the first and second horizontal rails, due to the load of the first post member.

Particularly, the first driving screw may be disposed at a center of the line connecting the driving centers of the first and second horizontal rails to each other, and the third horizontal rail may be disposed at a position corresponding between the heights of the first and second horizontal rails. Here, the third horizontal rail may be disposed on the line that is perpendicular to the center of the line connecting the first and second horizontal lines to each other. Thus, when the first driving screw rotates, the force imbalance, which may occur by the third horizontal rail, may be restrained to allow the first post member to be stably slid. Thus, the machining member for machining the workpiece may be accurately controlled in position.

Second, since the three points of the first post member and the first, second, and third vertical rails disposed on the second post member are slidably coupled to each other, the run-out error of the second post member in the left/right and front/rear directions, which may occur by the horizontal movement of the first post member according to the position of the second post member may be minimized to allow the second post member to be stably and accurately slid in the vertical direction.

Particularly, if the third vertical rail is disposed at a position that is parallel and opposite to the second driving screw with respect to the second post member, the force imbalance, which may occur in the first and second vertical rails by the third vertical rail when the second driving screw rotates, may be restrained to allow the second post member to be stably and smoothly slid. Thus, the machining member for machining the workpiece may be accurately controlled in position.

BRIEF DESCRIPTION OF THE DRAWINGS

FIG. 1 is a perspective view of a numerically controlled machine tool according to a preferred embodiment of the present invention.

FIG. 2 is an enlarged perspective view illustrating a state in which a first post member is installed on an upper body.

FIG. 3 is a view illustrating a relationship between the first member, a horizontal rail, and a first driving screw.

FIG. 4 is a view illustrating an arrangement relationship between first, second, and third horizontal rails and the first driving screw.

FIG. 5 is an enlarged perspective view illustrating a state in which a second post member is installed on the first post member.

FIG. 6 is a view illustrating a relationship between the second post member, a vertical rail, and a second driving screw.

DETAILED DESCRIPTION

Hereinafter, a numerically controlled machine tool according to a preferred embodiment of the present invention will be described in detail with reference to the accompanying drawings.

FIG. 1 is a perspective view of a numerically controlled machine tool according to a preferred embodiment of the present invention.

A numerically controlled machine tool according to the present invention includes a lower body 10, an upper body 20, a first post member 30, a first driving part 40, a second post member 50, a second driving part 60, and a worktable 70.

The lower body 10 has a flat top surface. The worktable 70 is installed on the top surface of the lower body 10 so as to be slidable along a rail (not shown).

The upper body 20 is installed on the top surface of the lower body 10 to support the first post member 30, the first driving part 40, the second post member 50, and the second driving part 60. The upper body 20 is constituted by a pair of supports 21 and 22 that are spaced apart from each other forward and backward to support the above-described components. The front support 21 that is disposed at a front side may have a height less than that of the rear support 22 that is disposed at a rear side. The front support 21 and the rear support 22 are spaced a predetermined distance from each other. The first post member 30 is disposed between the front and rear supports 21 and 22 so as to be slidable in a left/right direction.

The first post member 30 is installed on the upper body so as to be slidable in the left/right direction. Two points of a rear surface and one point of a front surface of the first post member 30 may be slidably coupled to first, second, and third horizontal rails that are disposed on the upper body 20, respectively.

The first driving part 40 is installed on a front surface of the rear support 22 of the two supports 21 and 22 constituting the upper body 20 to laterally move the first post member 30 when the first driving part 40 is driven. The first driving part 40 includes a first driving motor 41 and a first driving screw 42 shaft-coupled to the first driving motor 41 and to which a first coupling part 33 (that will be described below) disposed on the back surface of the first post member 30 is screw-coupled outside the first driving motor 41.

The second post member 50 is installed on the first post member 30 so as to be vertically slidable. A machining member (not shown) for machining the workpiece is mounted on a lower of the second post member 50.

The second driving part 60 is installed on the back surface of the first post member 30 to vertically move the second post member 50 when the second driving part 60 is driven.

The worktable 70 is installed on the top surface of the lower body 10, and the workpiece is mounted on a top surface of the workpiece 70. The worktable 70 is installed to be slidable forward and backward by a third driving part (not shown).

FIG. 2 is an enlarged perspective view illustrating a state in which the first post member is installed on the upper body, FIG. 3 is a view illustrating a relationship between the first member, the horizontal rail, and the first driving screw, and FIG. 4 is a view illustrating an arrangement relationship between the first, second, and third horizontal rails and the first driving screw.

The first, second, and third horizontal rails 80, 81, and 82 for guiding the sliding of the first post member 30 are lengthily installed on the two supports 21 and 21 constituting the upper body 20 in the left/right direction. As described above, a top surface of the rear support 22 has a height greater than that of a top surface of the front support 21.

The first horizontal rail 80 is installed on the top surface of the rear support 22, and a top surface of the first horizontal rail 80 is disposed above the top surface of the rear support 22. The second horizontal rail 81 is installed to be spaced a predetermined distance from the first horizontal rail 80 on a front surface of the rear support 22, and a top surface of the second horizontal rail faces a front side. The second horizontal rail 81 is disposed to protrude forward from the first horizontal rail 80. The third horizontal rail 82 is installed on the top surface of the front support 21, and a top surface of the third horizontal rail 82 is disposed above the top surface of the front support 21.

Sliding parts 31 respectively and slidably engaged with the horizontal rails 80, 81, and 82 are disposed on the two points of the back surface and the one point of the front surface of the first post member 30.

The sliding part 31 engaged with the third horizontal rail 82 may support the load of the first post member 30, which is concentrated forward, to secure a stable position of the first post member 30.

The first driving screw 42 is disposed at a center of a line L1 connecting a driving center of the first horizontal rail 80 to a driving center of the second horizontal rail 81. Also, the third horizontal rail 82 is disposed at a position corresponding between the heights of the first and second horizontal rails 80 and 81. Here, it is preferable that the third horizontal rail 82 is disposed on a line that is perpendicular to a center of the line L1 connecting the first and second horizontal rails 80 and 81 to each other. Also, it is preferable that a virtual line L2 connecting driving centers of the first and third horizontal rails 80 and 82 to each other and a virtual line L3 connecting driving centers of the second and third horizontal rails 81 and 82 to each other have the same length. Thus, a triangle that is defined by the lines L1, L2, and L3 connecting the driving centers of the horizontal rails 80, 81, and 82 to each other may be an isosceles triangle. This is done for a reason in which an imbalance in force that is transmitted into the first and second horizontal rails 80 and 81 due to moment generated by the third horizontal rail 82 when the first driving screw 41 rotates is solved to realize the stable sliding. Thus, the machining member for machining the workpiece may be accurately controlled in position.

The first driving screw 41 is shaft-coupled to the first driving motor 41, and a first coupling part 32 disposed on the back surface of the first post member 30 is screw-coupled to the outside of the first driving screw 42. Thus, when the first driving motor 41 is driven, the first post member 30 is laterally slid in a state where rotation of the first driving screw 42 is prevented when the first driving screw 42 rotates.

FIG. 5 is an enlarged perspective view illustrating a state in which the second post member is installed on the first post member, and FIG. 6 is a view illustrating a relationship between the second post member, the vertical rail, and the second driving screw.

An installation space through which the second post member 50 is installed to vertically pass is provided in the first post member 30. A plurality of sliding guides 33 respectively and slidably engaged with first, second, and third vertical rails 90, 91, and 92 that will be described below are installed inside the installation space.

The second post member 50 has a hollow and a flat back surface when viewed in a plane. Also, the second post member 50 has a curved front surface and both curved side portions.

The vertical rails 90, 91, and 92 for guiding the sliding of the second post member 50 in a vertical direction are lengthily installed on both side portions and front surface of the second post member 50 in the vertical direction.

The first and second vertical rails 90 and 91 are installed on both side portions of the second post member 50 to face each other. This is done for preventing the horizontal movement due to a change in vertical height of the second post member 50, which occurs by the horizontal movement of the first post member 30, from occurring.

The third vertical rail 92 is installed at a center of the front surface of the second post member 50. This is done for preventing the forward and backward movement due to a change in center of gravity of the second post member 50, which occurs when the second post member is vertically slid, from occurring.

The second driving part 60 is installed at a rear center of the second post member 50. The second driving part 60 includes a second driving motor 61 and a second driving screw 62 shaft-coupled to the second driving motor 61 and to which a second coupling part 51 disposed on the back surface of the second post member is screw-coupled outside the second driving motor 61. Here, the second driving screw 62 is disposed at the rear center of the second post member 50, and the third vertical rail 92 is disposed at a center of the front surface of the second post member 50. The third vertical rail 92 and the second driving screw 62 are disposed parallel to each other on opposite sides with respect to the second post member 50.

When the third vertical rail 92 is disposed at a position that is parallel and opposite to the second driving screw 62 as described above, the imbalance of the force transmitted into the first and second vertical rails 90 and 91 due to the moment occurring by the third vertical rail 92 when the second driving screw 62 rotates may be solved to allow the second post member 50 to be stably and smoothly slid. Therefore, the machining member for machining the workpiece may be accurately controlled in position.

Although the numerically controlled machine tool is described based on the preferred embodiment of the present invention as described above, the technical scope of the present invention is not limited to only the specific embodiment, and thus all suitable modifications and equivalents coming with the scope of the appended claims.

DESCRIPTION OF REFERENCE NUMERALS

10: Lower body
20: Upper body
21: Front support
22: Rear support
30: First post member
31: Sliding part
32: First coupling part
32: Sliding guide
40: First driving part
41: Second driving motor
42: First driving screw
50: Second post member
51: Second coupling part 60: Second driving part
61: Second driving motor
63: Second driving screw
70: Worktable
80: First horizontal rail
81: Second horizontal rail
82: Third horizontal rail
90: First vertical rail
91: Second vertical rail
92: Third vertical rail

What is claimed is:

1. A numerically controlled machine tool, comprising:
a body including a first longitudinal support having a longitudinal axis and an opposing second longitudinal support disposed parallel to the longitudinal axis;
a first post member disposed on the body between the first longitudinal support and the opposing second opposing longitudinal support;
a first driving part including a first driving motor connected to a first driving screw configured to translate the first post member in a first longitudinal direction along the longitudinal axis between the first longitudinal support and the opposing second longitudinal support, the first driving screw having a rotational axis disposed parallel to the longitudinal axis;
a first horizontal rail disposed on a top portion of the opposing second longitudinal support;
a second horizontal rail disposed on a vertically extending surface of the opposing second longitudinal support; and
a third horizontal rail disposed on a top portion of the first longitudinal support,
wherein the rotational axis of the first driving screw is disposed equidistant between a first horizontal rail driving center of the first horizontal rail and a second horizontal rail driving center of the second horizontal rail,
wherein a third horizontal rail driving center of the third horizontal rail is disposed equidistant between the first horizontal rail driving center and the second horizontal rail driving center, and the third horizontal rail driving center is also disposed on a line perpendicularly extending from the rotational axis of the first driving screw, and
wherein the first post member has a first side and an opposing second side, and the first post member is coupled to the first and second horizontal rails on the first side thereof, and is further coupled to the third horizontal rail on the opposing second side thereof.

2. The numerically controlled machine tool according to claim 1, further comprising:
a second post member installed on the first post member, and configured to be slidable in a vertical direction; and
a first vertical rail, a second vertical rail, and a third vertical rail each disposed on the second post member so as to extend in the vertical direction,
wherein the first vertical rail, the second vertical rail, and the third vertical rail are each coupled to a respective point on the first post member,
wherein the first vertical rail, the second vertical rail, and the third vertical rail work collectively to guide elevation of the second post member with respect to the first post member.

3. The numerically controlled machine tool according to claim 2, further comprising:
a second driving part constituted by a second driving screw that is screw-coupled to the second post member, the second driving part configured to slide the second post member in the vertical direction, and
a second driving motor configured to drive the second driving screw,
wherein the third vertical rail and the second driving screw are disposed in parallel to each other on opposite sides with respect to the second post member.

4. The numerically controlled machine tool according to claim 2, further comprising:
a machining member for machining a workpiece, the machining member being mounted to the second post member.

5. A numerically controlled machine tool, comprising:
a body including a first longitudinal support having a longitudinal axis and an opposing second longitudinal support disposed parallel to the longitudinal axis;
a first post member disposed on the body between the first longitudinal support and the opposing second longitudinal support;
a first driving part including a first driving motor connected to a first driving screw configured to translate the first post member in a first direction along the longitudinal axis between the first longitudinal support and the opposing second longitudinal support, the first driving screw having a rotational axis disposed parallel to the longitudinal axis;
a second post member installed on the first post member between the first longitudinal support and the opposing second longitudinal support, the second post member configured to be slidable in a vertical direction;
a first vertical rail, a second vertical rail, and a third vertical rail each disposed on the second post member so as to extend in the vertical direction between the first longitudinal support and the opposing second longitudinal support, the first vertical rail, the second vertical rail, and the third vertical rail each being coupled to a respective point on the first post member, wherein the first vertical rail, the second vertical rail, and the third vertical rail work collectively to guide elevation of the second post member with respect to the first post member;
a first horizontal rail disposed on a top portion of the opposing second longitudinal support;
a second horizontal rail disposed on a vertically extending surface of the opposing second longitudinal support; and
a third horizontal rail disposed on a top portion of the first longitudinal support,
wherein the rotational axis of the first driving screw is disposed equidistant between a first horizontal rail driving center of the first horizontal rail and a second horizontal rail driving center of the second horizontal rail, and
wherein a third horizontal rail driving center of the third horizontal rail is disposed equidistant between the first horizontal rail driving center and the second horizontal rail driving center, and the third horizontal rail driving center is also disposed on a line perpendicularly extending from the rotational axis of the first driving screw.

6. The numerically controlled machine tool according to claim 5, further comprising:
a second driving part constituted by a second driving screw that is screw-coupled to the second post member, the second driving part configured to slide the second post member in the vertical direction, and a second driving motor configured to drive the second driving screw,
wherein the third vertical rail and the second driving screw are disposed in parallel to each other on opposite sides with respect to the second post member.

7. The numerically controlled machine tool according to claim 5, further comprising:
a machining member for machining a workpiece, the machining member being mounted to the second post member.

8. A numerically controlled machine tool, comprising:
a body including a first longitudinal support and an opposing second longitudinal support;
a first post member installed on the body between the first longitudinal support and the opposing second longitudinal support;
a first driving screw configured to translate the first post member in a first longitudinal direction along a longitudinal axis between the first longitudinal support and the opposing second longitudinal support, the first driving screw having a rotational axis disposed parallel to the longitudinal axis;
a first horizontal rail and a second horizontal rail disposed on the opposing second longitudinal support; and
a third horizontal rail disposed on the first longitudinal support,
wherein the rotational axis of the first driving screw is disposed equidistant between a first horizontal rail driving center of the first horizontal rail and a second horizontal rail driving center of the second horizontal rail, and
wherein a third horizontal rail driving center of the third horizontal rail is disposed equidistant between the first horizontal rail driving center and the second horizontal rail driving center, and the third horizontal rail driving center is also disposed on a line perpendicularly extending from the rotational axis of the first driving screw.

9. The numerically controlled machine tool according to claim 8, further comprising:
a second post member installed on the first post member, and configured to be slidable in a vertical direction; and
a first vertical rail, a second vertical rail, and a third vertical rail each installed on the second post member so as to extend in the vertical direction,
wherein the first vertical rail, the second vertical rail, and the third vertical rail are each coupled to a respective point on the first post member,
wherein the first vertical rail, the second vertical rail, and the third vertical rail work collectively to guide elevation of the second post member with respect to the first post member.

10. The numerically controlled machine tool according to claim 9, wherein the first vertical rail and the second vertical rail are disposed on opposite side portions of the second post member.

11. The numerically controlled machine tool according to claim 9, further comprising:
a machining member for machining a workpiece, the machining member being mounted to the second post member.

12. The numerically controlled machine tool according to claim 8, further comprising:
a second driving part constituted by a second driving screw that is screw-coupled to the second post member, and configured to vertically slide the second post member, and
a second driving motor, which is configured to drive the second driving screw in the vertical direction, is disposed on the second post member,
wherein the third vertical rail and the second driving screw are disposed in parallel to each other.

* * * * *